United States Patent
Mori et al.

(10) Patent No.: US 7,304,654 B2
(45) Date of Patent: Dec. 4, 2007

(54) ORGANIC EL DISPLAY LUMINANCE CONTROL METHOD AND LUMINANCE CONTROL CIRCUIT

(75) Inventors: Yukio Mori, Hirakata (JP); Susumu Tanase, Kadoma (JP); Atsuhiro Yamashita, Osaka (JP); Masutaka Inoue, Neyagawa (JP); Shigeo Kinoshita, Higashiosaka (JP); Haruhiko Murata, Suita (JP)

(73) Assignee: Sanyo Electric Co., Ltd., Osaka (JP)

( * ) Notice: Subject to any disclaimer, the term of this patent is extended or adjusted under 35 U.S.C. 154(b) by 253 days.

(21) Appl. No.: 10/500,374

(22) PCT Filed: Dec. 26, 2002

(86) PCT No.: PCT/JP02/13728

§ 371 (c)(1),
(2), (4) Date: Oct. 28, 2004

(87) PCT Pub. No.: WO03/058593

PCT Pub. Date: Jul. 17, 2003

(65) Prior Publication Data

US 2005/0083268 A1   Apr. 21, 2005

(30) Foreign Application Priority Data

Dec. 28, 2001 (JP) .............................. 2001-400238
Mar. 28, 2002 (JP) .............................. 2002-091796

(51) Int. Cl.
*G09G 5/10* (2006.01)
*G09G 3/30* (2006.01)
(52) U.S. Cl. ........................................ 345/690; 345/77
(58) Field of Classification Search ................ 345/204, 345/690, 76, 77; 315/167, 169.3
See application file for complete search history.

(56) References Cited

U.S. PATENT DOCUMENTS

| | | | | |
|---|---|---|---|---|
| 5,668,569 A | * | 9/1997 | Greene et al. | 345/103 |
| 6,271,825 B1 | * | 8/2001 | Greene et al. | 345/694 |
| 6,479,940 B1 | * | 11/2002 | Ishizuka | 315/169.3 |

FOREIGN PATENT DOCUMENTS

| | | |
|---|---|---|
| JP | 6-350943 | 12/1994 |
| JP | 8-123385 | 5/1996 |
| JP | 9-147101 | 6/1997 |
| JP | 10-268832 | 10/1998 |
| JP | 11-275386 | 10/1999 |
| JP | 2000-56730 A | 2/2000 |
| JP | 2000-89712 A | 3/2000 |
| JP | 2000-221945 A | 8/2000 |
| JP | 2000-267628 | 9/2000 |
| JP | 2000-322022 | 11/2000 |
| JP | 2001-22319 A | 1/2001 |
| JP | 2001-086393 | 3/2001 |
| JP | 2001-109434 A | 4/2001 |
| JP | 2001-184015 A | 7/2001 |
| JP | 2001-272968 | 10/2001 |
| JP | 2001-320454 A | 11/2001 |
| JP | 2001-350450 A | 12/2001 |
| WO | WO 99/45703 A1 | 10/1999 |

OTHER PUBLICATIONS

Japanese Office Action issued in corresponding Japanese Patent Application No. JP 2003-314724, dated Jan. 31, 2007.

* cited by examiner

*Primary Examiner*—Thuy Vinh Tran
(74) *Attorney, Agent, or Firm*—McDermott Will & Emery LLP

(57) ABSTRACT

A luminance control method for an organic EL display comprises a first step of calculating a luminance accumulation value for each screen on the basis of a video input signal, and a second step of controlling the amplitude of the video input signal on the basis of the luminance accumulation value calculated in the first step and feeding to the organic EL display the video signal whose amplitude has been controlled.

9 Claims, 11 Drawing Sheets

"PRIOR ART"

"PRIOR ART"

ORGANIC EL DISPLAY LUMINANCE CONTROL METHOD AND LUMINANCE CONTROL CIRCUIT

This Application is a National Phase Application under 35 U.S.C. 371 claiming the benefit of PCT/JP02/13728 filed on Dec. 26, 2002, which has priority based on Japan Applications No. 2001-400238 filed on Dec. 28, 2001 and 2002-91976 filed on Mar. 28, 2002.

TECHNICAL FIELD

The present invention relates to a luminance control method and a luminance control circuit for an organic electroluminescence (EL) display and a portable telephone set comprising the organic EL display.

BACKGROUND ART

Examples of organic EL displays include passive-type ones having a simple matrix structure and active-type ones using a TFT (Thin Film Transistor).

FIG. 1 illustrates the basic pixel structure of the active type organic EL display.

A circuit corresponding to one pixel in the active type organic EL display comprises a switching TFT 101, a capacitor 102, a driving TFT 103, and an organic EL element 104.

A display signal Data (Vin) is applied to the drain of the switching TFT 101 through a display signal line 111. A selection signal SCAN is applied to the base of the switching TFT 101 through a selection signal line 112. The switching TFT 101 has its source connected to the base of the driving TFT 103 and grounded through the capacitor 102.

A driving power supply voltage Vdd is applied to the drain of the driving TFT 103 through a power supply line 113. The driving TFT 103 has its source connected to the anode of the organic EL element 104. The cathode of the organic EL element 104 is grounded.

The switching TFT 101 is subjected to ON/OFF control by the selection signal SCAN. The capacitor 102 is charged by the display signal Data (Vin) fed through the switching TFT 101 when the switching TFT 101 is turned on. The capacitor 102 holds a charging voltage when the switching TFT 101 is turned off. The driving TFT 103 supplies to the organic EL element 104 a current corresponding to the voltage, held in the capacitor 102, which is applied to the base thereof.

FIG. 2 illustrates the relationship between the display signal Data (Vin) and a light-emitting luminance (a driving current) of the organic EL element 104 in the basic pixel structure shown in FIG. 1.

In FIG. 2, RefW and RefB respectively indicate a white-side reference voltage for defining a light-emitting luminance corresponding to the white level of an input signal and a black-side reference voltage for defining a light-emitting luminance corresponding to the black level of the input signal.

In the above-mentioned active type organic EL display, a large current flows through the organic EL element 104 with respect to an image which is bright on the whole screen. When the large current flows through the organic EL element 104, power consumption is increased. When the large current continues to flow through the organic EL element 104, the degradation of the performance thereof is advanced.

Therefore, a technique for detecting the current flowing into the cathode of the organic EL element 104, and controlling the power supply voltage Vdd of the organic EL element 104 in response to the value of the detected current, thereby reducing the power supply voltage to reduce a driving current when the overall screen is bright, for example, has been developed (see JP-A-2000-267628).

The control of the power supply voltage by the above-mentioned prior art is feedback control for controlling the power supply voltage Vdd of the organic EL element 104 in response to the value of the detected current. In the case of the feedback control, when the brightness of a video is rapidly changed, for example, excessive control easily occurs. In the case, a luminance varies in a short period, which is so-called "hunting".

An object of the present invention is to provide a luminance control method and a luminance control circuit for an organic EL display capable of achieving power saving as well as restraining the degradation in the performance of an organic EL element and capable of preventing "hunting" from occurring.

Another object of the present invention is to provide a portable telephone set capable of changing the display luminance of an organic EL display depending on peripheral brightness.

A further object of the present invention is to provide a portable telephone set capable of changing the display luminance of an organic EL display depending on the direction of a portable telephone set.

DISCLOSURE OF INVENTION

A luminance control method for an organic EL display according to the present invention is characterized by comprising a first step of calculating a luminance accumulation value for each screen on the basis of a video input signal; and a second step of controlling the amplitude of the video input signal on the basis of the luminance accumulation value calculated in the first step, and feeding to the organic EL display the video signal whose amplitude has been controlled and in that in the second step, the amplitude of the video input signal is controlled, when the luminance accumulation value calculated in the first step exceeds a predetermined value, such that the larger the difference between the luminance accumulated value and the predetermined value is, the smaller the amplitude of the video input signal becomes.

When the video input signal is a digital video signal, a reference voltage supplied to a digital-to-analog (DA) converter for converting the digital video input signal into an analog video signal is controlled on the basis of the luminance accumulation value calculated in the first step, to control the amplitude of, the video input signal in the second step.

The reference voltage supplied to the digital-to-analog converter includes a black-side reference voltage for defining a light-emitting luminance corresponding to the black level of the input signal and a white-side reference voltage for defining a light-emitting luminance corresponding to the white level of the input signal, and in the second step, the white-side reference voltage is controlled on the basis of the luminance accumulation value calculated in the first step.

A luminance control circuit for an organic EL display according to the present invention is characterized by comprising a digital-to-analog converter for converting a digital video input signal into an analog video output signal on the basis of input/output characteristics defined by a given reference voltage, and feeding the analog video output signal to the organic EL display; and a reference voltage control circuit for controlling the reference voltage supplied to the digital-to-analog converter on the basis of the digital video input signal, and in that the reference voltage control circuit comprises a luminance accumulation value calculation circuit for calculating a luminance accumulation value for each screen on the basis of the digital video input signal, and a voltage control circuit for controlling the reference voltage supplied to the digital-to-analog converter on the basis of the luminance accumulation value calculated by the luminance accumulation value calculation circuit the reference voltage supplied to the digital-to-analog converter includes a black-side reference voltage for defining a light-emitting luminance corresponding to the black level of the input signal and a white-side reference voltage for defining a light-emitting luminance corresponding to the white level of the input signal, and the voltage control circuit controls, when the luminance accumulation value calculated by the luminance accumulation value calculation circuit exceeds a predetermined value, the white-side reference voltage such that the larger the difference between the luminance accumulation value and the predetermined value is, the lower the light-emitting luminance corresponding to the white level of the input signal becomes.

The voltage control circuit comprises a gain calculation circuit for calculating a gain for controlling the white-side reference voltage on the basis of the luminance accumulation value calculated by the luminance accumulation value calculation circuit, and a control circuit for controlling the white-side reference voltage on the basis of the gain calculated by the gain calculation circuit.

The gain calculation circuit has such input/output characteristics that a gain to be outputted is set to a constant value when the inputted luminance accumulation value is not more than a predetermined value, and the larger the inputted luminance accumulation value is, the smaller the gain to be outputted is made when the inputted luminance accumulation value exceeds the predetermined value, and the control circuit controls the white-side reference voltage such that the smaller the gain is, the lower the light-emitting luminance corresponding to the white level of the input signal becomes.

The voltage control circuit comprises a gain calculation circuit for calculating a first gain for controlling the white-side reference voltage on the basis of the luminance accumulation value calculated by the luminance accumulation value calculation circuit, a multiplication circuit for multiplying the first gain calculated by the gain calculation circuit by a second gain given from the exterior, and a control circuit for controlling the white-side reference voltage on the basis of a third gain which is the result of the multiplication by the multiplication circuit.

The gain calculation circuit has such input/output characteristics that a gain to be outputted is set to a constant value when the inputted luminance accumulation value is not more than a predetermined value, and the larger the inputted luminance accumulation value is, the smaller the gain to be outputted is made when the inputted luminance accumulation value exceeds the predetermined value, and the control circuit controls the white-side reference voltage such that the smaller the third gain is, the lower the light-emitting luminance corresponding to the white level of the input signal becomes.

In a portable telephone set comprising a camera having an automatic exposure control function and an organic EL display, a first portable telephone set according to the present invention is characterized by comprising judgment means for judging peripheral brightness on the basis of exposure control information relating to the camera, and display luminance control means for controlling the display luminance of the organic EL display on the basis of the peripheral brightness judged by the judgment means.

The display luminance control means controls the display luminance of the organic EL display such that the display luminance of the organic EL display is reduced when the peripheral brightness judged by the judgment means is low, while being increased when the peripheral brightness judged by the judgment means is high.

The exposure control information relating to the camera is one selected from exposure time information and AGC gain information.

In a portable telephone set comprising an organic EL display, a second portable telephone set according to the present invention is characterized by comprising detection means for detecting the direction of a display surface of the organic EL display; and display luminance control means for controlling the display luminance of the organic EL display on the basis of the direction of the display surface of the organic EL display which is detected by the detection means.

The display luminance control means controls the display luminance of the organic EL display such that the display luminance of the organic EL display is increased when the display surface of the organic EL display is directed upward, while being reduced when the display surface of the organic EL display is directed downward.

BEST MODE FOR CARRYING OUT THE INVENTION

Referring now to FIGS. 3 to 10, embodiments of the present invention will be described.

[1] Description of First Embodiment

Figure 3:
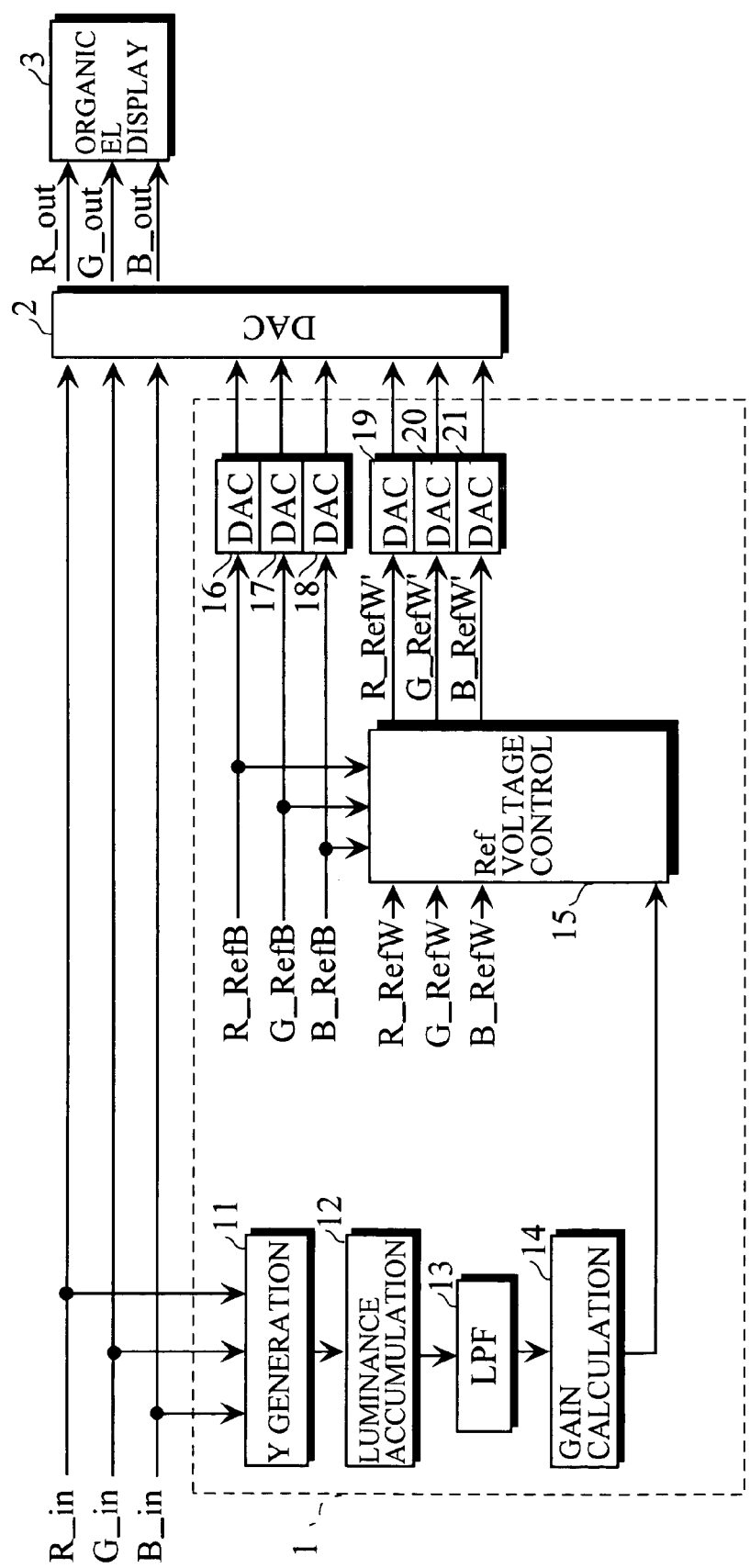
FIG. 3 illustrates the configuration of a luminance control circuit for an organic EL display according to a first embodiment of the present invention.
Figure 4:
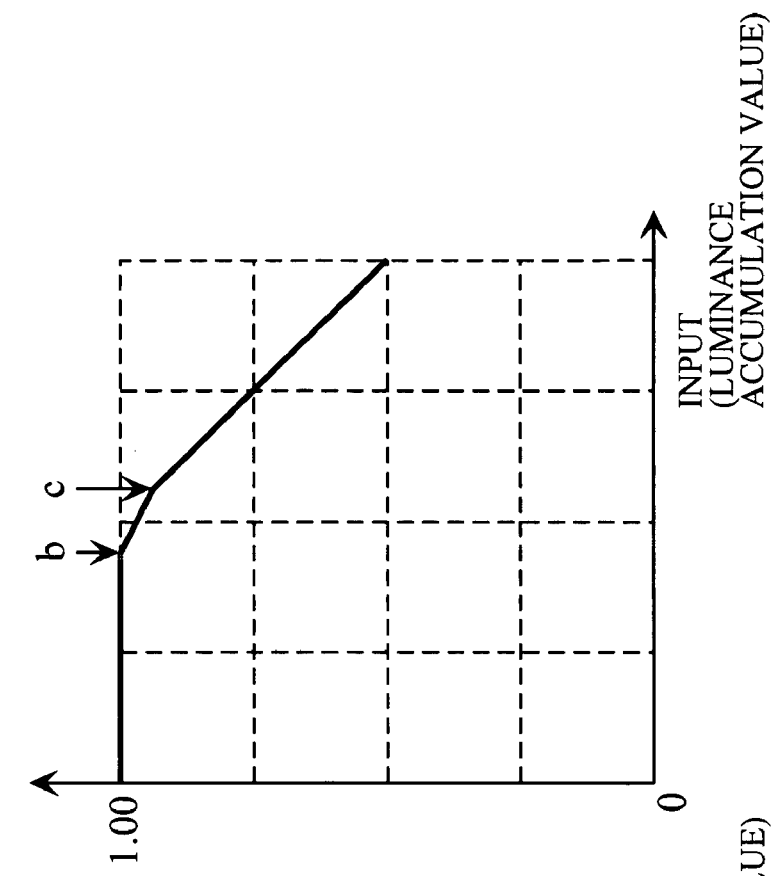
FIGS. 4($a$) and 4($b$) are graphs showing examples of the input/output characteristics of a gain calculation circuit 14.
Figure 4:
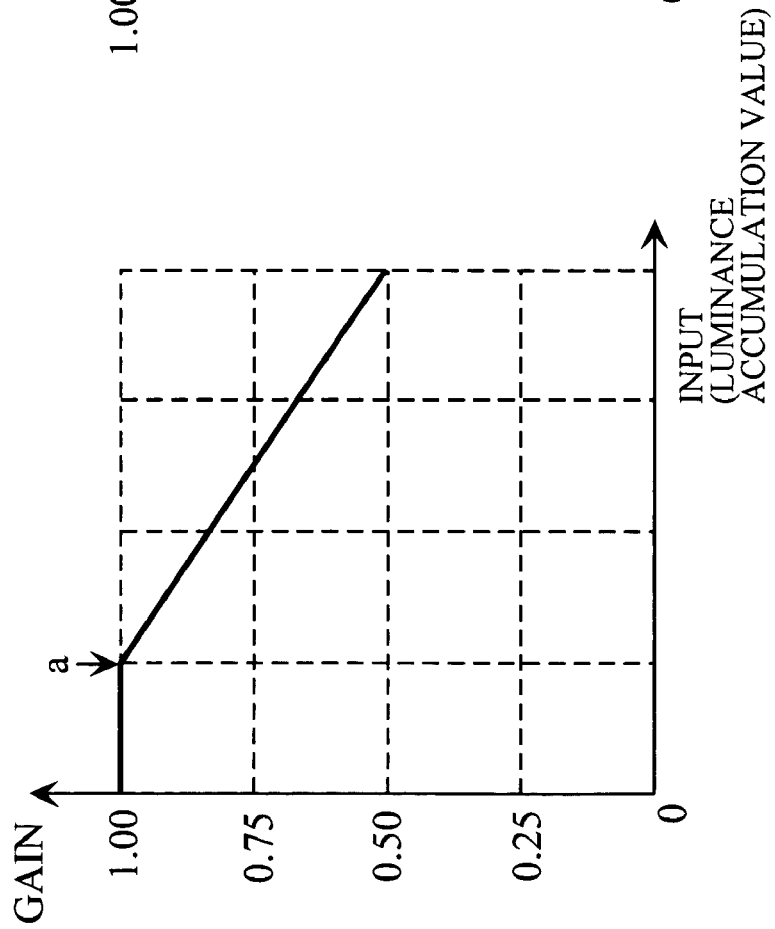

FIG. 3 illustrates the configuration of a luminance control circuit for an organic EL display according to a first embodiment of the present invention.

The luminance control circuit for the organic EL display comprises a reference voltage control circuit 1 and a DAC (Digital-to-Analog Converter) 2. Digital video input signals R_in, G_in, and B_in are fed to the reference voltage control circuit 1 and are fed to the DAC 2. The reference voltage control circuit 1 controls a reference voltage supplied to the DAC 2. The reference voltage supplied to the DAC 2 includes black-side reference voltages R_RefB, G_RefB, and B_RefB (generically referred to as a RefB) and white-side reference voltages R_RefW, G_RefW, and B_RefW (generically referred to as RefW), respectively, with respect to colors R (Red), G (Green), and B (Blue).

The black-side reference voltage RefB is a reference voltage for defining a light-emitting luminance corresponding to the black level of an input signal, and is fixed in the present embodiment. The white-side reference voltage RefW is a reference voltage for defining a light-emitting luminance corresponding to the white level of an input signal, and is controlled by the reference voltage control circuit 1 in the present embodiment.

Figure 1:
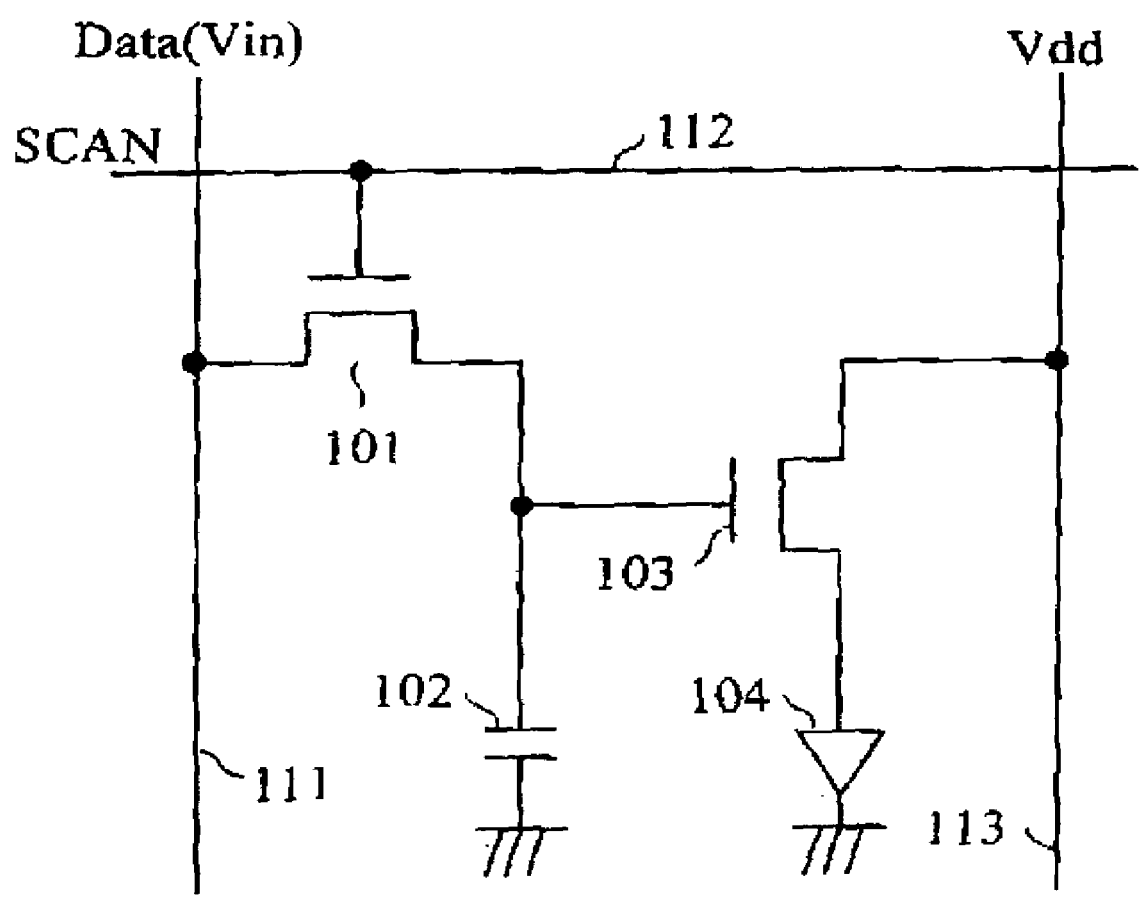
FIG. 1 is a circuit diagram showing the basic pixel structure of an active type organic EL display.
Figure 2:
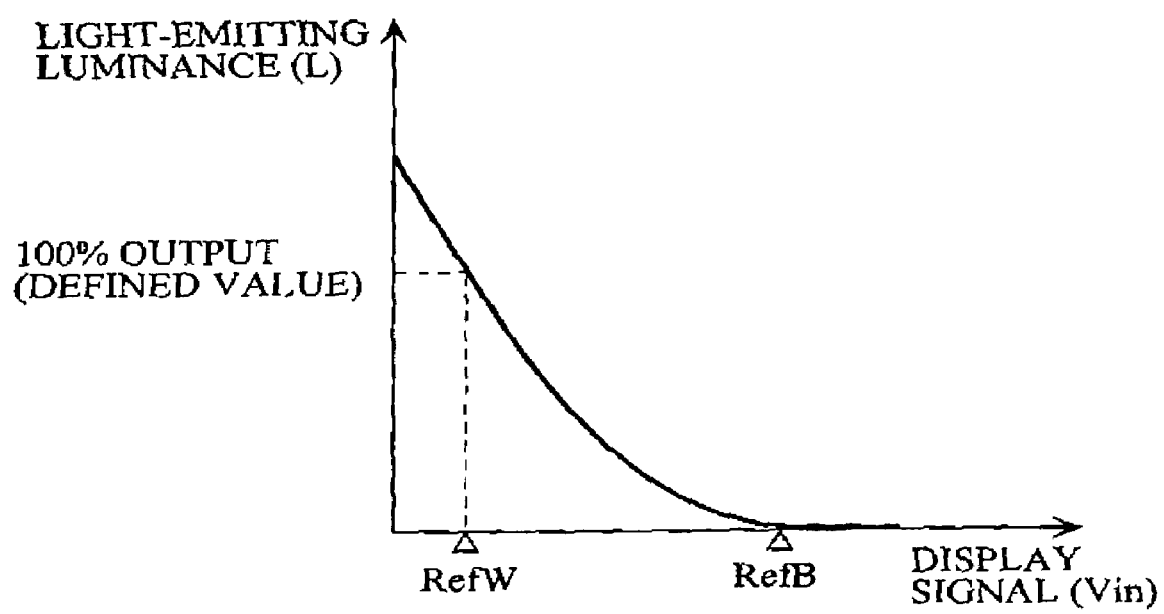
FIG. 2 is a graph showing the relationship between a display signal Data (Vin) and a light-emitting luminance (a driving current) of an organic EL element in the basic pixel structure shown in FIG. 1.

The DAC 2 respectively converts the digital video input signals R_in, G_in, and B_in into analog video output signals R_out, G_out, and B_out on the basis of input/output characteristics defined by the black-side reference voltage RefB and the white-side reference voltage RefW' which are fed from the reference voltage control circuit 1. The analog video output signals R_out, G_out, and B_out obtained by the DAC 2 are fed to the organic EL display 3. The analog video output signals R_out, G_out, and B_out correspond to the display signal Data (Vin) shown in FIG. 1.

The reference voltage control circuit 1 comprises a luminance signal generation circuit (Y generation circuit) 11, a luminance accumulation circuit 12, an LPF (Low-Pass Filter) 13, a gain calculation circuit 14, a reference voltage control circuit (Ref voltage control circuit) 15, and a plurality of DACs 16 to 21.

The luminance signal generation circuit 11 generates a luminance signal Y on the basis of the digital video input signals R_in, G_in, and B_in. The luminance accumulation circuit 12 calculates a luminance accumulation value for each frame on the basis of the luminance signal Y generated by the luminance signal generation circuit 11. The LPF 13 smoothes in the time direction the luminance accumulation value for each frame calculated by the luminance accumulation circuit 12. Although the LPF 13 is provided to slowly change a gain Gain, described later, with a rapid change in brightness, it may be omitted.

The gain calculation circuit 14 calculates the gain Gain for controlling the white-side reference voltage RefW depending on the luminance accumulation value for each frame obtained from the LPF 13. FIGS. 4(a) and 4(b) respectively illustrate examples of input/output characteristics of the gain calculation circuit 14, that is, the characteristics of a gain against a luminance accumulation value for each frame.

In the characteristics shown in FIG. 4(a), the gain is 1.00 when the luminance accumulation value for each frame is 0 to a, and gradually decreases when the luminance accumulation value for each frame exceeds a. In the characteristics shown in FIG. 4(b), the gain is 1.00 when the luminance accumulation value for each frame is 0 to b, gently decreases when the luminance accumulation value for each frame is b to c, and somewhat rapidly decreases when the luminance accumulation value for each frame exceeds c.

The reference voltage control circuit 15 generates white-side reference voltages R_RefW', G_RefW', and B_RefW' after control for the colors R, G and B on the basis of the black-side reference voltages R_RefB, G_RefB, and B_RefB previously set for the colors R, G, and B, the white-side reference voltages R_RefW, G_RefW, and B_RefW previously set for the colors R, G, and B, and the gain Gain calculated by the gain calculation circuit 14.

Each of the black-side reference voltages R_RefB, G_RefB, B_RefB and each of the white-side reference voltages R_RefW, G_RefW, B_RefW are respectively fed as digital signals.

Although the reference voltage control circuit 15 includes reference voltage control circuits respectively corresponding to the colors R, G, and B, their respective configurations are the same. Therefore, description is herein made of the reference voltage control circuit corresponding to the color R.

Figure 5:
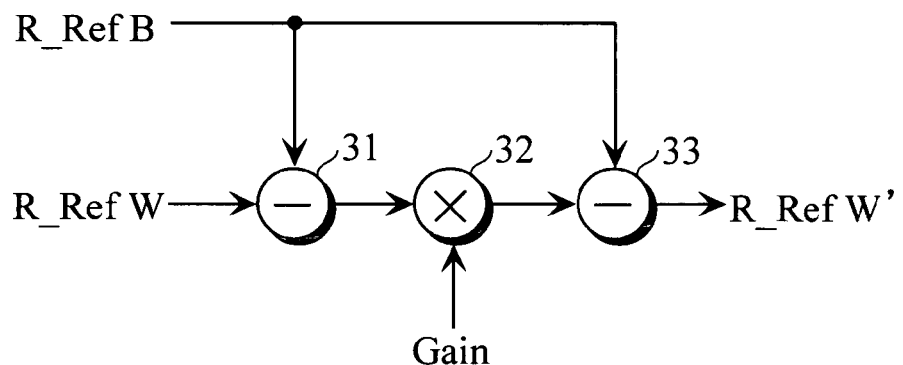
FIG. 5 is a circuit diagram showing a reference voltage control circuit corresponding to R.

FIG. 5 illustrates the reference voltage control circuit corresponding to the color R.

The reference voltage control circuit comprises a subtracter 31, a multiplier 32, and a subtracter 33.

The subtracter 31 operates the difference (R_RefB−R_RefW) between the black-side reference voltage R_RefB corresponding to the color R and the white-side reference voltage R_RefW corresponding to the color R. The multiplier 32 multiplies an output of the subtracter 31 (R_RefB−R_RefW) by the gain Gain. The subtracter 33 subtracts an output of the multiplier 32 (Gain×(R_RefB−R_RefW)) from the black-side reference voltage R_RefB, to calculate a white-side reference voltage R_RefW' after control.

When the gain is 1.00, the white-side reference voltage R_RefW' after control is equal to the white-side reference voltage R_RefW. The smaller the gain Gain becomes, that is, the larger the luminance accumulation value for each frame becomes, the larger the white-side reference voltage R_RefW' after control becomes, to come closer to the black-side reference voltage R_RefB. That is, the larger the luminance accumulation value for each frame becomes, the lower a light-emitting luminance (a driving current), corresponding to the white level of an input signal, of the organic EL element becomes.

The black-side reference voltages R_RefB, G_RefB, B_RefB are respectively converted into analog signals by DACs 16, 17, and 18, and are fed to the DAC 2. The white-side reference voltages R_RefW', G_RefW', B_RefW' after control are respectively converted into analog signals by the DACs 19, 20, and 21, and are fed to the DAC 2.

Figure 6:
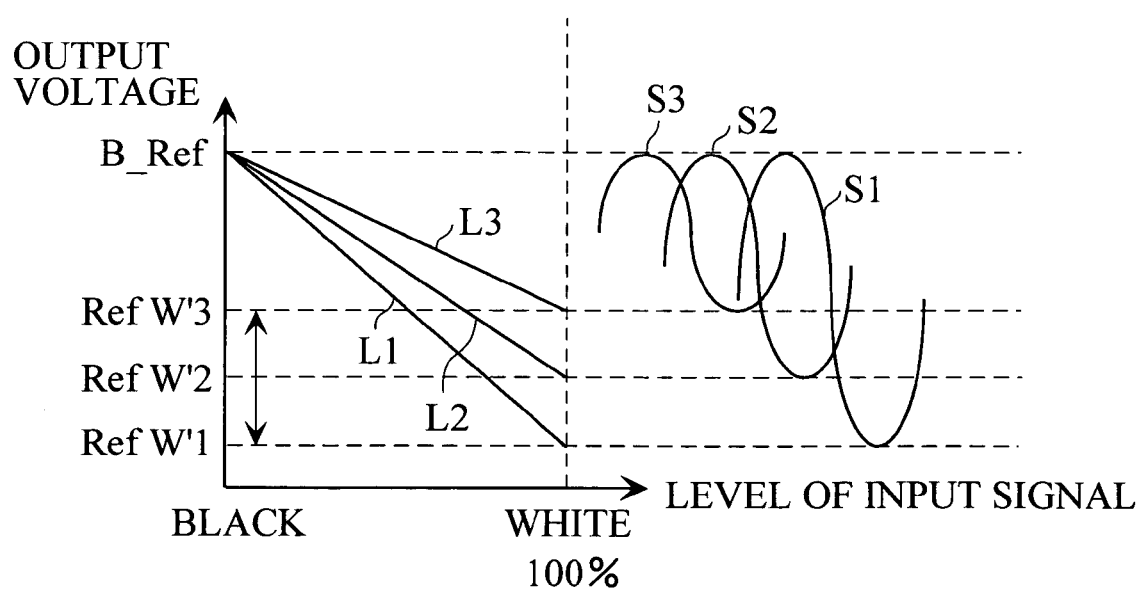
FIG. 6 is a graph showing the input/output characteristics of a DAC 2.

FIG. 6 illustrates the input/output characteristics of the DAC 2.

In FIG. 6, RefW'1 indicates a white-side reference voltage (=a white-side reference voltage RefW) supplied to the DAC 2 when the luminance accumulation value is small (in the case of a dark video). RefW'3 indicates a white-side reference voltage supplied to the DAC 2 when the luminance accumulation value is large (in the case of a bright video) RefW'2 indicates a white-side reference voltage supplied to the DAC 2 when the luminance accumulation value is an intermediate value (in the case of a video with intermediate brightness).

When the white-side reference voltage supplied to the DAC 2 is RefW'1, the input/output characteristics of the DAC 2 are characteristics indicated by a straight line L1. In this case, when an input signal which changes from a black level to a white level is periodically inputted to the DAC 2, an output waveform as indicated by a curved line S1 is obtained.

When the white-side reference voltage supplied to the DAC 2 is RefW'3, the input/output characteristics of the DAC 2 are characteristics indicated by a straight line L3. In this case, when an input signal which changes from a black level to a white level is periodically inputted to the DAC 2, an output waveform as indicated by a curved line S3 is obtained.

When the white-side reference voltage supplied to the DAC 2 is RefW'2, the input/output characteristics of the DAC 2 are characteristics indicated by a straight line L2. In this case, when an input signal which changes from a black level to a white level is periodically inputted to the DAC 2, an output waveform as indicated by a curved line S2 is obtained.

That is, it is found by controlling the white-side reference voltage depending on the luminance accumulation value for each frame that the amplitude of the output signal of the DAC 2 is controlled.

In the above-mentioned embodiment, when the input video is a bright video, the amplitude of a video input signal (display signal) is reduced, thereby reducing the driving current for the organic EL element. Since the amplitude of the video input signal is controlled by controlling a reference voltage at the time of digital-to-analog conversion, the gray scale is not reduced.

Since the amplitude of the video input signal (display signal) is controlled by feed forward control, no "hunching" occurs.

[2] Description of Second Embodiment

Figure 7:
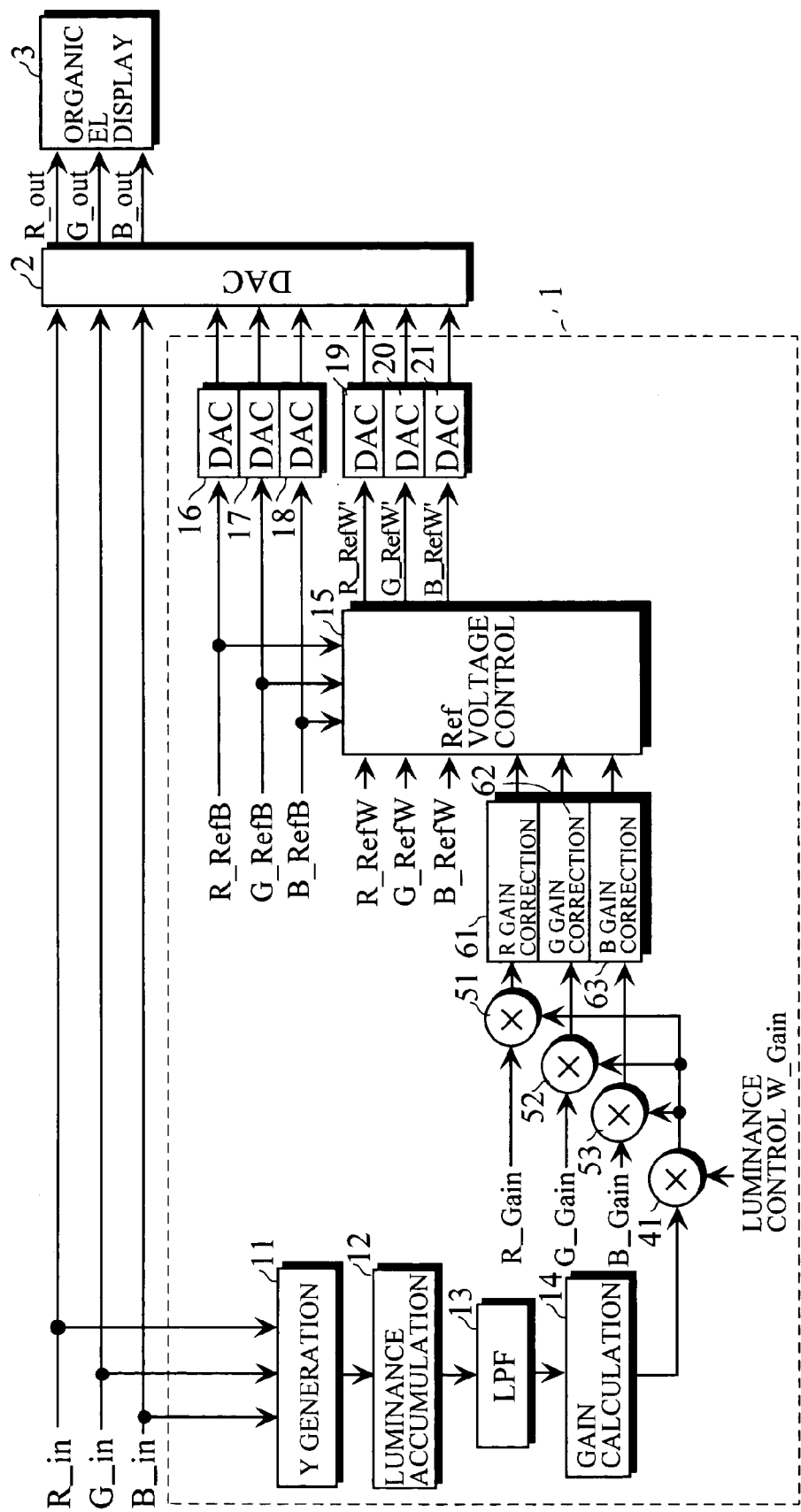
FIG. 7 illustrates the configuration of a luminance control circuit for an organic EL display according to a second embodiment of the present invention.
Figure 8:
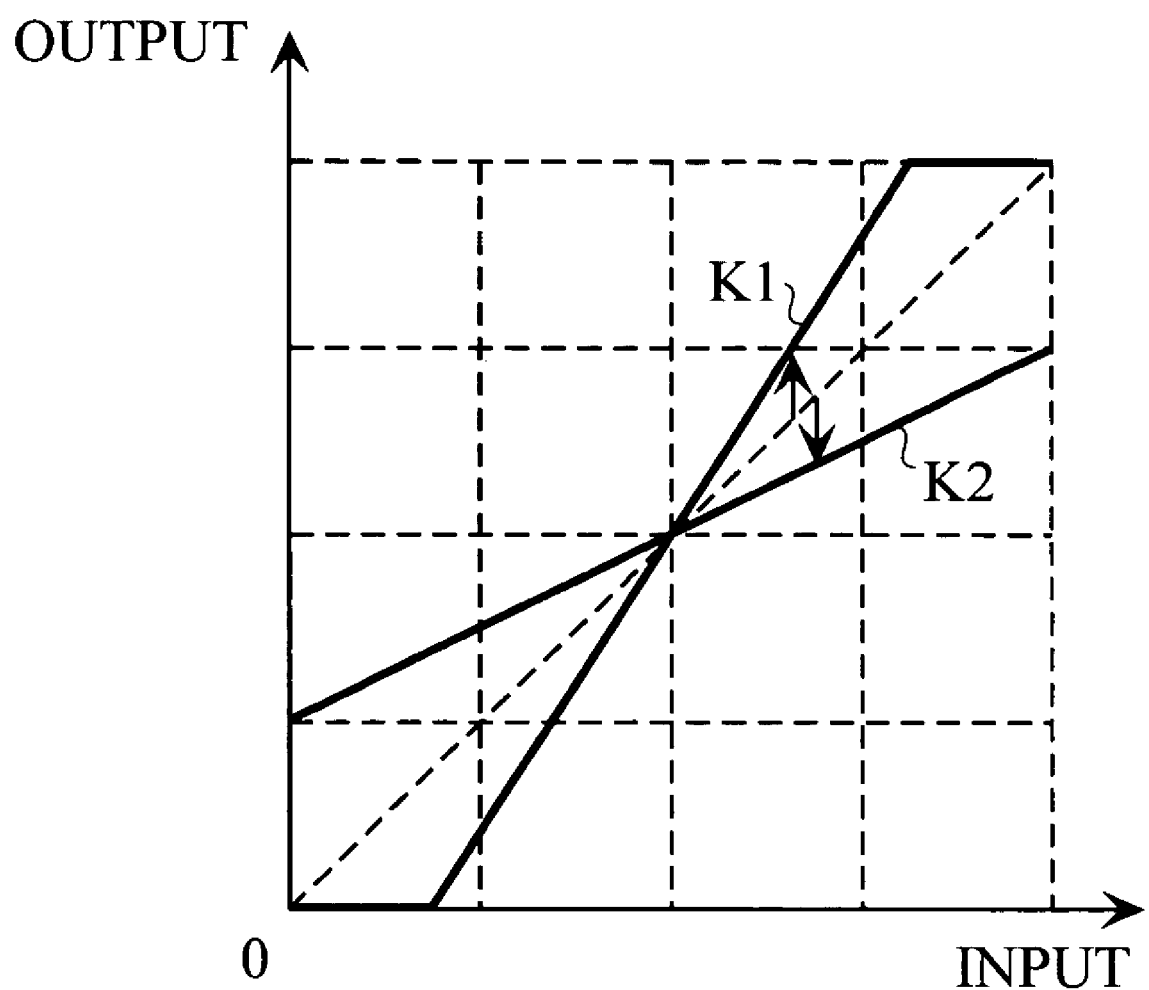
FIG. 8 is a graph showing an example of the setting of the input/output characteristics of each of gain correction circuits 61, 62, and 63.

FIG. 7 illustrates the configuration of a luminance control circuit for an organic EL display according to a second embodiment of the present invention. In FIG. 7, the same components as those shown in FIG. 3 are assigned the same reference numerals and hence, the description thereof is not repeated.

The luminance control circuit for the organic EL display according to the second embodiment differs from the luminance control circuit for the organic EL display according to the first embodiment in the following points.

(1) A multiplier 41 for controlling a luminance for the whole screen from the exterior is provided in a reference voltage control circuit 1.

(2) Multipliers 51, 52, and 53 for allowing white balance control are provided in the reference voltage control circuit 1.

(3) The characteristics of a light-emitting luminance corresponding to a display signal differ for colors R, G, and B, so that gain correction circuits 61, 62, and 63 for correcting a gain Gain are provided for the colors R, G, and B.

The differences will be described in more detail.

The gain Gain calculated by a gain calculation circuit 14 is inputted to the multiplier 41. A whole luminance control signal W_Gain for controlling the luminance for the whole screen from the exterior is fed to the multiplier 41. By controlling the signal W_Gain given to the multiplier 41, it is possible to make the screen bright when the display is used in a bright place and to make the screen dark after an elapse of a predetermined time period.

An output of the multiplier 41 is fed to each of the multipliers 51, 52, and 53. Arbitrary gains R_Gain, G_Gain, B_Gain are respectively fed for the colors R, G, and B to the multipliers 51, 52, and 53. Since the gains R_Gain, G_Gain, B_Gain respectively given to the multipliers 51, 52, and 53 can be individually controlled, white balance control can be made.

Outputs of the multipliers 51, 52, and 53 are respectively given to the corresponding gain correction circuits 61, 62, and 63. Each of the gain correction circuits 61, 62, and 63 sets input/output characteristics, as indicated by straight lines K1 and K2 shown in FIG. 8, for example, thereby correcting the inputted gain.

In a reference voltage control circuit 15, white-side reference voltages are corrected for the colors R. G, and B using the gains, respectively given from the gain correction circuits 61, 62, and 63, corresponding to the colors R, G, and B.

[3] Description of Third Embodiment

Figure 9:
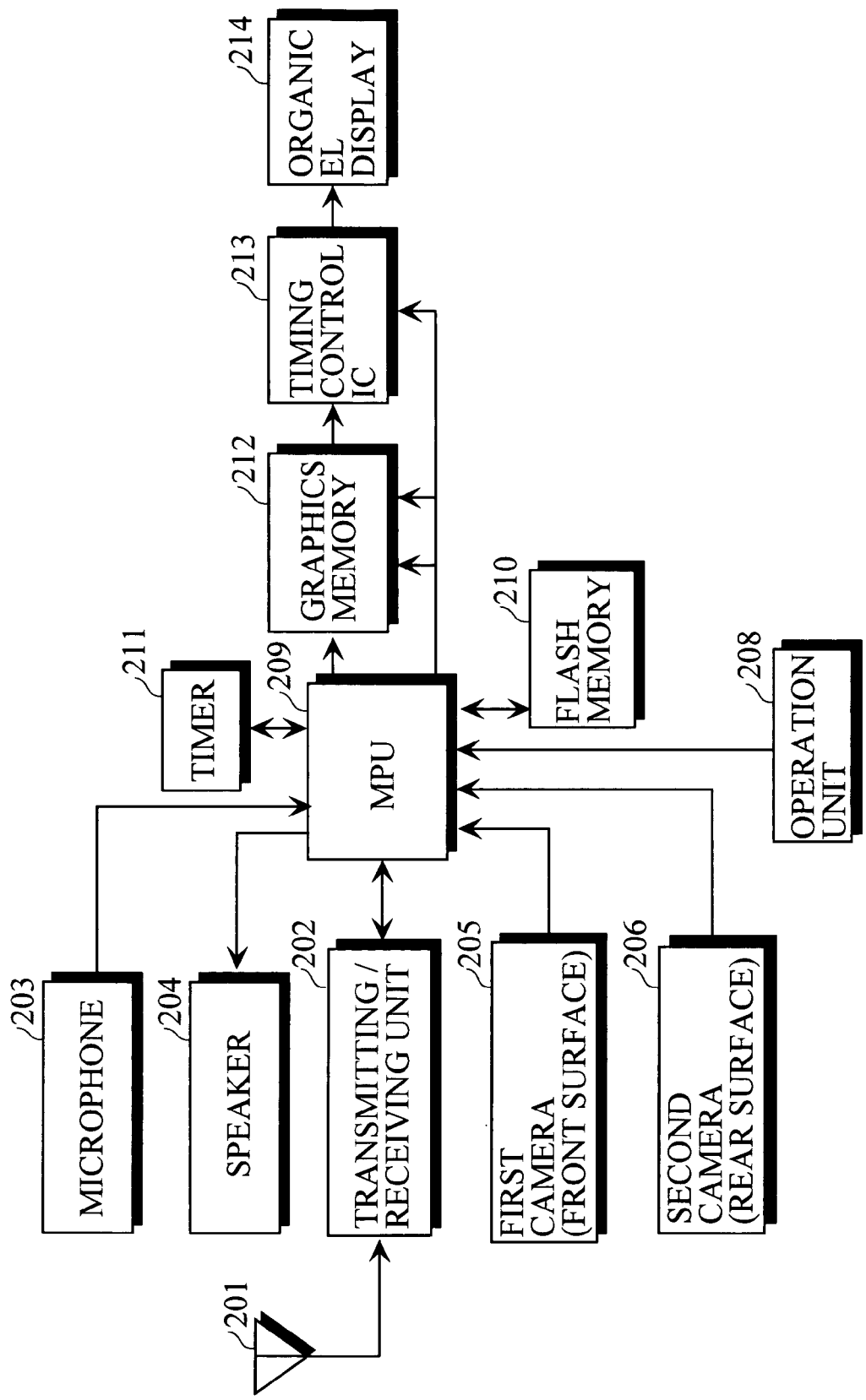
FIG. 9 is a block diagram showing the schematic configuration of a portable telephone set according to a third embodiment of the present invention.

FIG. 9 illustrates the schematic configuration of a portable telephone set.

An MPU (Microprocessor Unit) 209 carries out the overall control of the portable telephone set. An antenna 201 transmits and receives electric waves. A transmitting/receiving unit 202 receives the electric waves, and transmits the contents of the receiving to the MPU 209. Further, the transmitting/receiving unit 202 transmits a transmission signal outputted from the MPU 209 with the transmission signal on the electric waves.

A microphone 203 feeds an audio signal to the MPU 209. A speaker 204 outputs as an audio the audio signal outputted from the MPU 209. A first camera 205 is a camera mounted on a front surface of the main body of the portable telephone set provided with an organic EL display 214, and sends to the MPU 209 a video which it has picked up. A second camera 206 is a camera mounted on a rear surface of the main body of the portable telephone set, and sends to the MPU 209 a video which it has picked up. At the time of an imaging mode, the video picked up by the camera 205 or 206 is displayed on the organic EL display 214 in place of the content of the display at the time of a normal mode.

Figure 10:
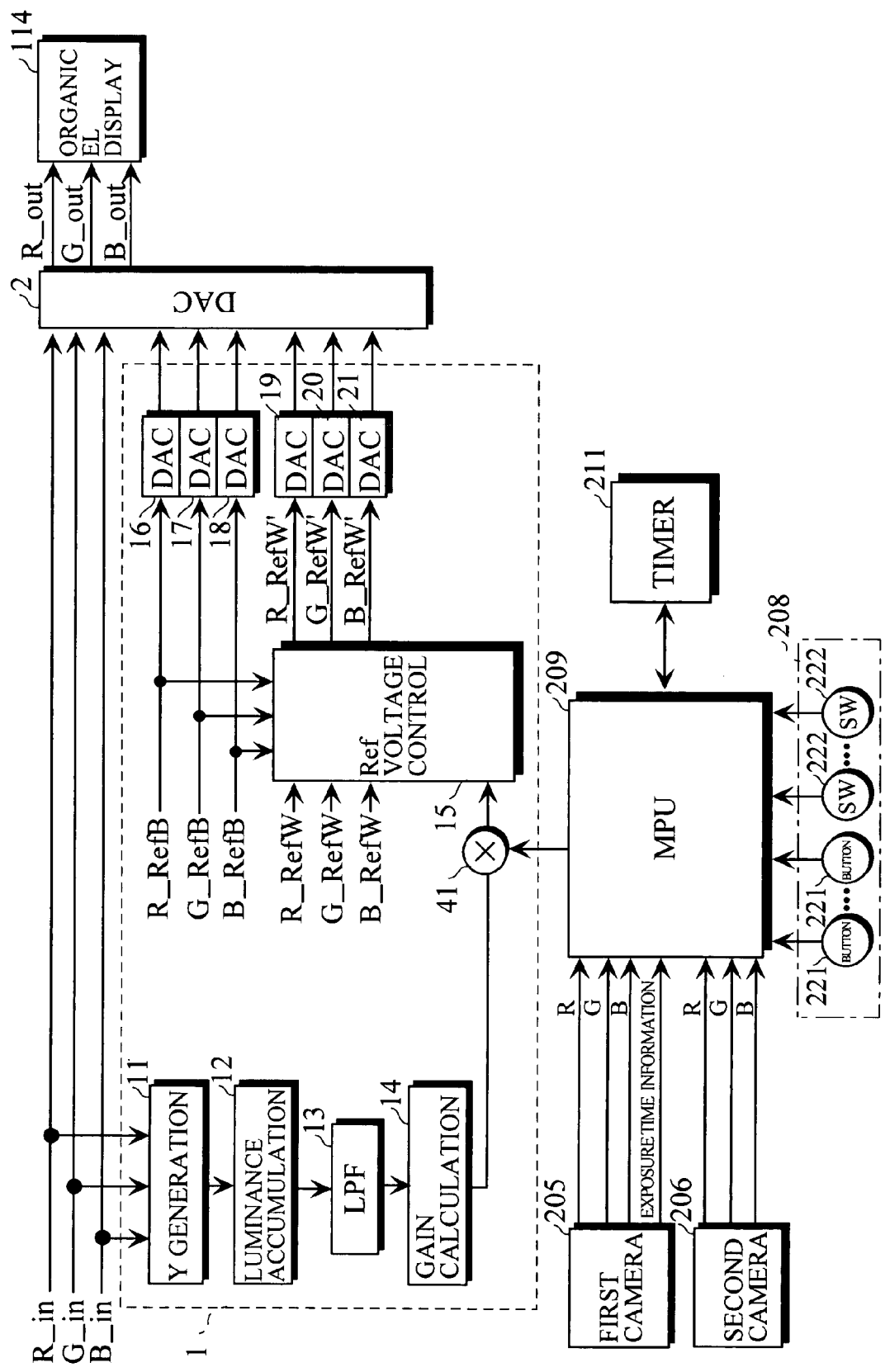
FIG. 10 is a block diagram showing the configuration of a luminance control circuit provided in a timing control IC 213 shown in FIG. 9, and an MPU 209 for controlling a luminance for the whole screen and its peripheral device.

An operation unit 208 is provided in the main body of the portable telephone set, and comprises various buttons 221 and various switches 222, as shown in FIG. 10. A timer 211 is used for luminance control, described later.

A flash memory 210 stores data to be stored even when the power is turned off. A graphics memory 212 stores image data to be displayed on the display. Image data is written into a predetermined address in the graphics memory 212 on the basis of image data outputted from the MPU 209 and a writing control signal. Pixel data representing a corresponding pixel is outputted at the timing of scanning in conformity with a display period of the organic EL display 214 from the graphics memory 212.

A timing control IC 213 feeds image data and a driving signal to the organic EL display 214, and displays a video on the organic EL display 214. The timing control IC 213 comprises a luminance control circuit.

FIG. 10 illustrates the configuration of the luminance control circuit provided in the timing control IC 213, and the MPU 209 for controlling a luminance for the whole screen and its peripheral device.

In FIG. 10, the same components as those shown in FIG. 3 are assigned the same reference numerals and hence, the description thereof is not repeated. The luminance control circuit shown in FIG. 10 is approximately the same as the luminance control circuit shown in FIG. 3 except that a multiplier 41 for controlling a luminance for the whole screen (a display luminance) is provided in a reference voltage control circuit 1. An whole luminance control signal W_Gain given to the multiplier 41 is generated by the MPU 209.

The various buttons 208 and the various switches 222 which are provided in the operation unit 208 are connected to the MPU 209. The MPU 209 comprises the timer 211. The cameras 205 and 206 are connected to the MPU 209. Each of the cameras 205 and 206 has an automatic exposure control function. In this example, exposure time information is sent to the MPU 209 from the first camera 205 mounted on the front surface of the main body of the portable telephone set.

The MPU 209 estimates peripheral brightness under current environments in which the portable telephone set is used on the basis of the exposure time information from the first camera 205, to generate the whole luminance control signal W_Gain. The whole luminance control signal W_Gain takes a value between 2.0 and 0.5, for example.

Specifically, when the exposure time is long, that is, the peripheral brightness is low, the whole luminance control signal W_Gain is reduced. As a result, a gain outputted from the multiplier 41 becomes smaller than a gain calculated by the gain calculation circuit 14, and a white-side reference voltage R_Refw' after control becomes high, so that the display luminance becomes low. Conversely, when the exposure time is short, that is, the peripheral brightness is high, the whole luminance control signal W_Gain is increased. As a result, the gain outputted from the multiplier 41 becomes larger than the gain calculated by the gain calculation circuit 14, and the white-side reference voltage R_Refw' after control becomes low, so that the display luminance becomes high.

The above-mentioned control may be carried out using AGC gain information relating to the first camera 205 in place of the exposure time information relating to the first camera 205. In this case, when the AGC gain is large, it is judged that the peripheral brightness is low, to reduce the whole luminance control signal W_Gain. Conversely, when the AGC gain is small, it is judged that the peripheral brightness is high, to increase the whole luminance control signal W_Gain.

The MPU 209 reduces, when the various buttons 221 or the various switches 222 which are provided in the operation unit 208 are operated, the whole luminance control signal W_Gain is reduced, to increase the display luminance. When a predetermined time period has elapsed, the whole luminance control signal W_Gain is increased, to reduce the display luminance.

It is judged using the timer 211 whether or not a predetermined time period has elapsed. Specifically, the timer 211 is reset when the buttons 221 or the switches 222 are operated, to automatically start measurement of time. The luminance for the screen is controlled depending on the time measured by the timer 211. When not less than the predetermined time period has elapsed, the display luminance is reduced by half.

[4] Description of Fourth Embodiment

Figure 11:
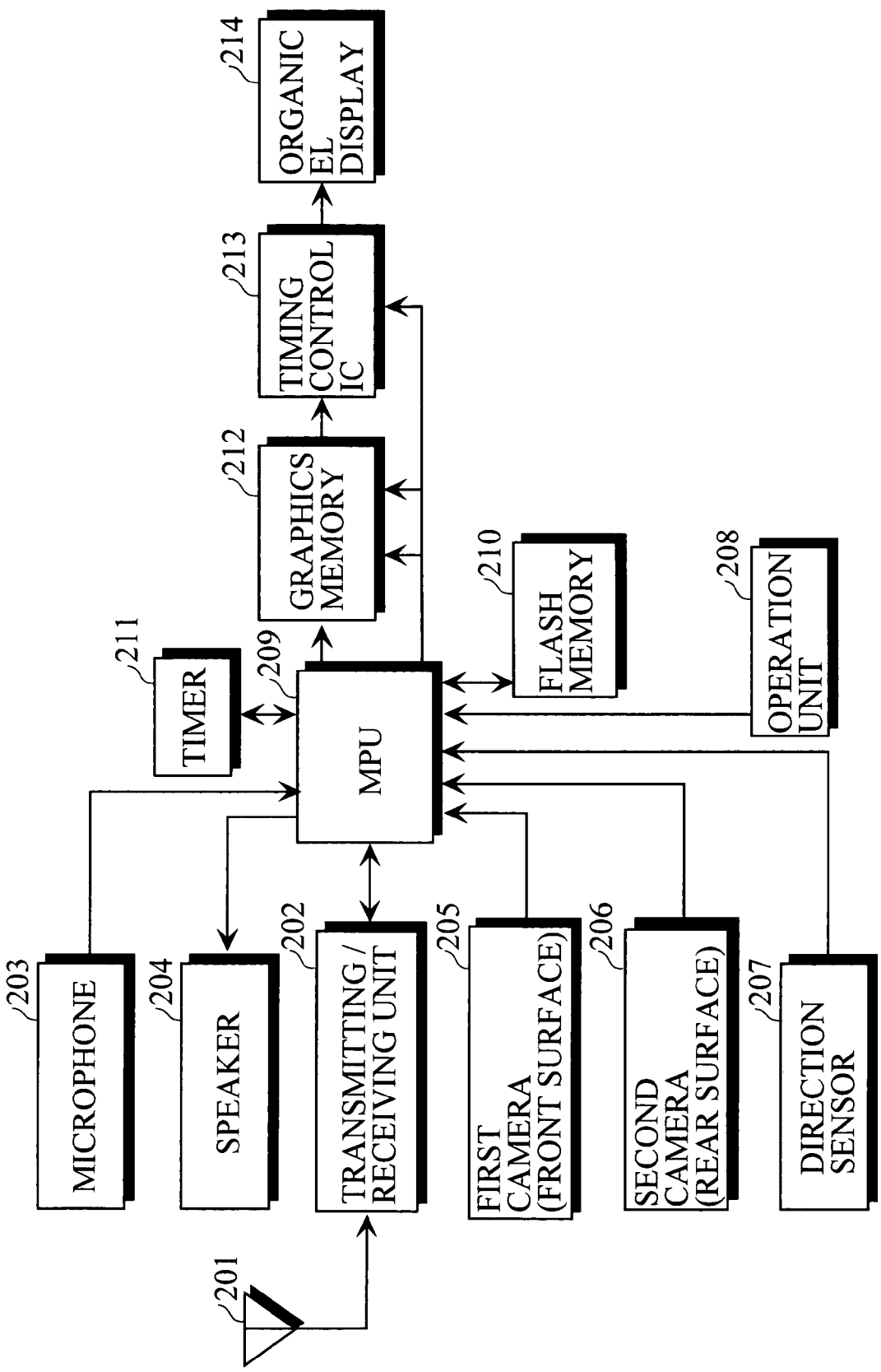
FIG. 11 is a block diagram showing the schematic configuration of a portable telephone set according to a fourth embodiment of the present invention.

FIG. 11 illustrates the schematic configuration of a portable telephone set. In FIG. 11, the same components as those shown in FIG. 9 are assigned the same reference numerals and hence, the description thereof is not repeated.

The portable telephone set differs from the portable telephone set shown in FIG. 9 in that a direction sensor 207 for sensing the direction (upward, downward, sideward, etc.) of a display surface of an organic EL display 214 is provided. In the portable telephone set, display luminance control based on exposure time information from a first camera 205 is not carried out.

Figure 12:
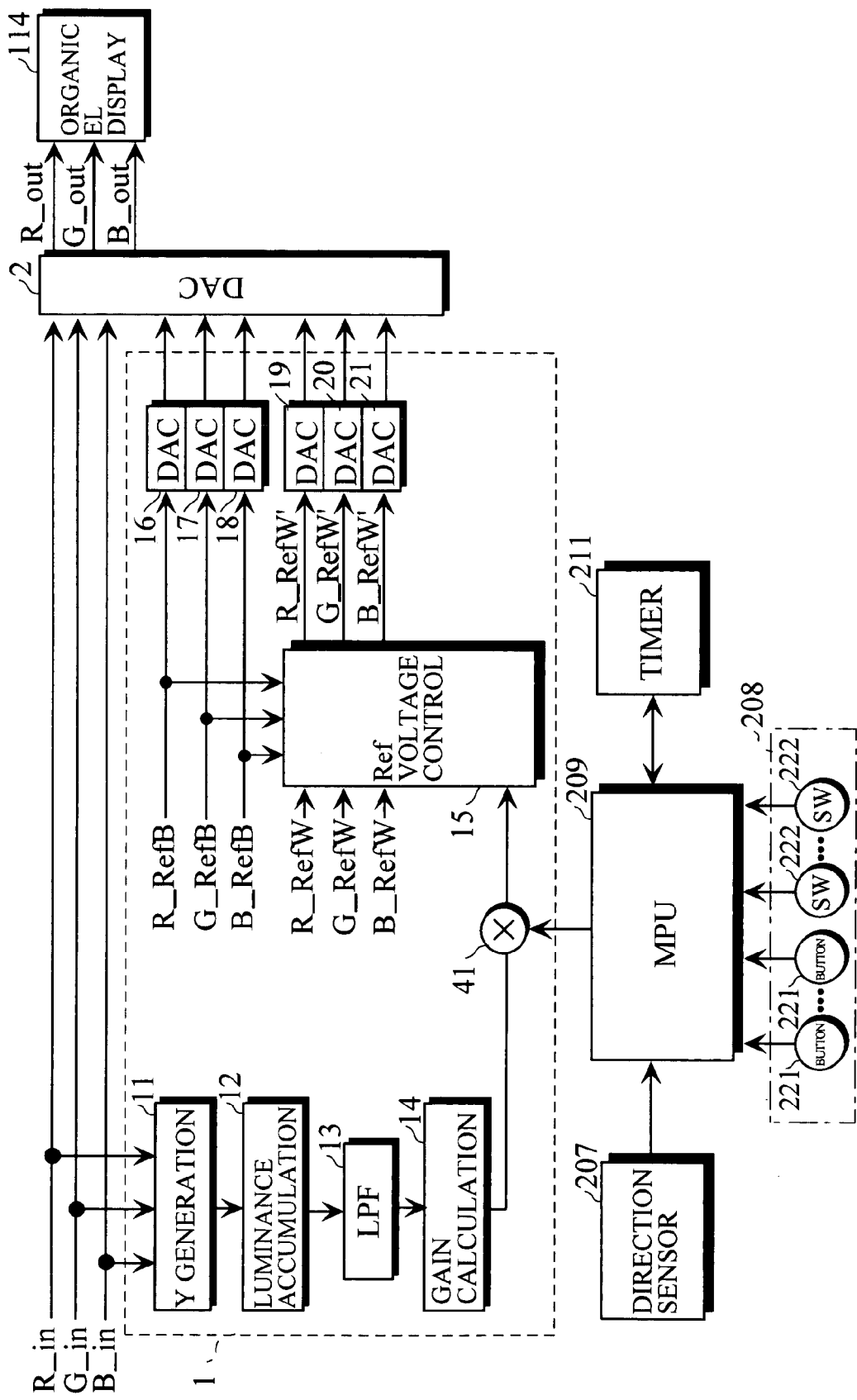
FIG. 12 is a block diagram showing the configuration of a luminance control circuit provided in a timing control IC 213 shown in FIG. 11, and an MPU 209 for controlling a luminance for the whole screen and its peripheral device.

FIG. 12 illustrates the configuration of a luminance control circuit provided in a timing control IC 213, and an MPU 209 for controlling a luminance for the whole screen and its peripheral device.

In FIG. 12, the same components as those shown in FIG. 3 are assigned the same reference numerals and hence, the description thereof is not repeated. Although the luminance control circuit shown in FIG. 12 is approximately the same as the luminance control circuit shown in FIG. 3, it differs from the luminance control circuit shown in FIG. 3 in that a multiplier 41 for controlling a luminance for the whole screen (a display luminance) is provided in a reference voltage control circuit 1. A whole luminance control signal W_Gain given to the multiplier 41 is generated by the MPU 209.

Various buttons 221 and various switches 222 which are provided in an operation unit 208 are connected to the MPU 209. The MPU 209 comprises a timer 211. The direction sensor 207 is connected to the MPU 209.

The MPU 209 estimates the direction (upward, downward, sideward, etc.) of the display surface of the organic EL display 214 on the basis of a detection signal of the direction sensor 207, to generate a whole luminance control signal W_Gain. The whole luminance control signal W_Gain takes a value between 2.0 and 0.5, for example.

Specifically, as the display surface of the organic EL display 214 is directed upward, the whole luminance control signal W_Gain is reduced, thereby making the display luminance higher. The whole luminance control signal W_Gain is controlled to a small value when the display surface of the organic EL display is directed upward, is controlled to a large value when the display surface of the organic EL display 214 is directed downward, and is controlled to an intermediate value when the display surface of the organic EL display 214 is directed sideward.

Furthermore, the MPU 209 reduces the whole luminance control signal W_Gain when the various buttons 221 or the various switches 222 which are provided in the operation unit 208 are operated, as in the above-mentioned third embodiment, thereby making the display luminance higher. When a predetermined time period has elapsed, the whole luminance control signal W_Gain is increased, thereby reducing the display luminance.

The direction (upward, downward, sideward, etc.) of the display surface of the organic EL display 214 may be detected from the exposure times and the AGC gains of two cameras 205 and 206.

That is, when the display surface of the organic EL display 214 is directed upward, the possibility that a front surface of the main body of the portable telephone set is brighter than a rear surface thereof is high. Therefore, it is considered that the exposure time of the first camera 205 attached to the front surface of the main body of the portable telephone set is shorter than the exposure time of the second camera 206 attached to the rear surface of the main body of the portable telephone set (the AGC gain thereof is reduced when the exposure times are the same).

Conversely, when the display surface of the organic EL display 214 is directed downward, the possibility that the rear surface of the main body of the portable telephone set is brighter than the front surface thereof is high. Therefore, it is considered that the exposure time of the second camera 206 attached to the rear surface of the main body of the portable telephone set is shorter than the exposure time of the first camera 205 attached to the front surface of the main body of the portable telephone set (the AGC gain thereof is reduced when the exposure times are the same).

Therefore, the direction of the display surface of the organic EL display 214 can be judged by the exposure times and the AGC gains of the two cameras 205 and 206.

The invention claimed is:

1. A luminance control method for an organic electroluminescence display, characterized by comprising:
    a first step of calculating a luminance accumulation value for each frame on the basis of a video input signal; and
    a second step of controlling an amplitude of the video input signal on the basis of the luminance accumulation value calculated in the first step, and feeding to the organic electroluminescence display the video signal whose amplitude has been controlled and in that
    in the second step, the amplitude of the video input signal is controlled, when the luminance accumulation value calculated in the first step exceeds a predetermined value, such that the larger the difference between the luminance accumulation value and the predetermined value is, the smaller the amplitude of the video input signal becomes.

2. A luminance control method for an organic electroluminescence display, characterized by comprising:
    a first step of calculating a luminance accumulation value for each frame on the basis of a video input signal;
    a second step of controlling an amplitude of the video input signal on the basis of the luminance accumulation value calculated in the first step, and feeding to the organic electroluminescence display the video signal whose amplitude has been controlled and in that
    in the second step, the amplitude of the video input signal is controlled, when the luminance accumulation value calculated in the first step exceeds a predetermined value, such that the larger the difference between the luminance accumulation value and the predetermined value is, the smaller the amplitude of the video input signal becomes;
    the video input signal is a digital video signal, and
    in the second step, a reference voltage supplied to a digital-to-analog converter for converting the digital video input signal into an analog video signal is controlled on the basis of the luminance accumulation value calculated in the first step, to control the amplitude of the video input signal.

3. The luminance control method for the organic electroluminescence display according to claim 2, characterized in that
    the reference voltage supplied to the digital-to-analog converter includes a black-side reference voltage for defining a light-emitting luminance corresponding to a black level of the input signal and a white-side reference voltage for defining a light-emitting luminance corresponding to a white level of the input signal, and
    in the second step, the white-side reference voltage is controlled on the basis of the luminance accumulation value calculated in the first step.

4. A luminance control circuit for an organic electroluminescence display, characterized by comprising
    a digital-to-analog converter for converting a digital video input signal into an analog video output signal on the basis of input/output characteristics defined by a given reference voltage, and feeding the analog video output signal to the organic electroluminescence display; and
    a reference voltage control circuit for controlling the reference voltage supplied to the digital-to-analog converter on a basis of the digital video input signal, and in that
    the reference voltage control circuit comprises a luminance accumulation value calculation circuit for calculating a luminance accumulation value for each frame on the basis of a digital video input signal, and a voltage control circuit for controlling the reference voltage supplied to the digital-to-analog converter on the basis of the luminance accumulation value calculated by the luminance accumulation value calculation circuit
    the reference voltage supplied to the digital-to-analog converter includes a black-side reference voltage for defining a light-emitting luminance corresponding to a black level of the input signal and a white-side reference voltage for defining a light-emitting luminance corresponding to a white level of the input signal, and
    the voltage control circuit controls, when the luminance accumulated value calculated by the luminance accumulation value calculation circuit exceeds a predetermined value, the white-side reference voltage such that the larger the difference between the luminance accumulation value and the predetermined value is, the lower the light-emitting luminance corresponding to the white level of the input signal becomes.

5. The luminance control circuit for the organic electroluminescence display according to claim 4, characterized in that
    the voltage control circuit comprises a gain calculation circuit for calculating a gain for controlling the white-side reference voltage on the basis of the luminance accumulation value calculated by the luminance accumulation value calculation circuit, and a control circuit for controlling the white-side reference voltage on the basis of the gain calculated by the gain calculation circuit.

6. The luminance control circuit for the organic electroluminescence display according to claim 5, characterized in that
    the gain calculation circuit has such input/output characteristics that a gain to be outputted is set to a constant value when the inputted luminance accumulation value is not more than a predetermined value, and the larger the inputted luminance accumulation value is, the smaller the gain to be outputted is made when the inputted luminance accumulation value exceeds the predetermined value, and
    the control circuit controls the white-side reference voltage such that the smaller the gain is, the lower the light-emitting luminance corresponding to the white level of the input signal becomes.

7. The luminance control circuit for the organic electroluminescence display according to claim 4, characterized in that
    the voltage control circuit comprises a gain calculation circuit for calculating a first gain for controlling the white-side reference voltage on the basis of the luminance accumulation value calculated by the luminance accumulation value calculation circuit, a multiplication circuit for multiplying the first gain calculated by the gain calculation circuit by a second gain given from the exterior, and a control circuit for controlling the white-side reference voltage on the basis of a third gain which is the result of the multiplication by the multiplication circuit.

8. The luminance control circuit for the organic electroluminescence display according to claim 7, characterized in that the gain calculation circuit has such input/output characteristics that a gain to be outputted is set to a constant value when the inputted luminance accumulation value is not more than a predetermined value, and the larger the inputted luminance accumulation value is, the smaller the gain to be outputted is made when the inputted luminance accumulation value exceeds the predetermined value, and the control circuit controls the white-side reference voltage such that the smaller the third gain is, the lower the light-emitting luminance corresponding to the white level of the input signal becomes.

9. An apparatus for receiving video input signals and transmitting video output signals, wherein the apparatus comprises:
   a) a luminance accumulation calculation portion configured for calculating a luminance accumulation for each frame, as a first function of the video input signals;
   b) a gain calculation portion configured for calculating a gain, as a second function of the luminance accumulation and a predetermined value, and wherein the gain decreases if the luminance accumulation exceeds at least one predetermined value;
   c) a generating portion configured for generating controlled white-side reference voltages, as a third function of black-side reference voltages, white-side reference voltages, and the gain;
   d) a video transmission portion configured for transmitting video output signals, as a fourth function of the video input signals, the black-side reference voltages, and the controlled white-side reference voltages.

* * * * *